United States Patent
Siminou

(10) Patent No.: US 9,626,578 B2
(45) Date of Patent: Apr. 18, 2017

(54) VIEWING AID WITH TRACKING SYSTEM, AND METHOD OF USE

(75) Inventor: Kamran Siminou, Newport Coast, CA (US)

(73) Assignee: ENHANCED VISION SYSTEMS, INC., Huntington Beach, CA (US)

( * ) Notice: Subject to any disclaimer, the term of this patent is extended or adjusted under 35 U.S.C. 154(b) by 1015 days.

(21) Appl. No.: 13/309,412

(22) Filed: Dec. 1, 2011

(65) Prior Publication Data

US 2013/0141556 A1    Jun. 6, 2013

(51) Int. Cl.
| | |
|---|---|
| *H04N 7/18* | (2006.01) |
| *G06K 9/20* | (2006.01) |
| *H04N 1/195* | (2006.01) |
| *G09B 21/00* | (2006.01) |
| *H04N 1/00* | (2006.01) |

(52) U.S. Cl.
CPC ......... *G06K 9/2081* (2013.01); *G06K 9/2054* (2013.01); *G09B 21/008* (2013.01); *H04N 1/19594* (2013.01); *G06K 2209/01* (2013.01); *H04N 1/00347* (2013.01); *H04N 2201/0081* (2013.01); *H04N 2201/0089* (2013.01); *H04N 2201/043* (2013.01); *H04N 2201/0436* (2013.01)

(58) Field of Classification Search
None
See application file for complete search history.

(56) References Cited

U.S. PATENT DOCUMENTS

| | | | | |
|---|---|---|---|---|
| 5,831,667 | A | * | 11/1998 | Siminou .................. 348/63 |
| 5,959,605 | A | | 9/1999 | Gilblom |
| 6,115,482 | A | * | 9/2000 | Sears et al. ............. 382/114 |

(Continued)

FOREIGN PATENT DOCUMENTS

| | | |
|---|---|---|
| JP | 07-234919 A | 9/1995 |
| JP | 07234919 A * | 9/1995 ............... G06K 9/34 |
| JP | 2007-172251 A | 7/2007 |

OTHER PUBLICATIONS

PCT International Search Report for PCT/US2012/067431, Applicant: Enhanced Vision Systems, Inc., Form PCT/ISA/210 and 220, dated Mar. 8, 2013 (9 pages).

(Continued)

*Primary Examiner* — Joseph Ustaris
*Assistant Examiner* — Edemio Navas, Jr.
(74) *Attorney, Agent, or Firm* — Vista IP Law Group LLP

(57) ABSTRACT

A viewing aid includes a camera, a viewing surface within a field of view of the camera, a memory, a display, and software programmed to track a tracking element within the field of view. Viewing material is placed on the viewing surface. The camera, viewing surface, and material all remain substantially stationary. The camera captures and stores an initial image of the material in the memory. The software then tracks the location of a tracking element within the field of view then maps the location to a portion of the initial image in memory using an X-Y coordinate system, and/or identifies character elements of the material adjacent the tracking element then maps the character elements to corresponding character elements of the initial image in memory. An enhanced image is then displayed on the display corresponding to the mapped portion of the initial image.

24 Claims, 3 Drawing Sheets

(56) References Cited

U.S. PATENT DOCUMENTS

| | | |
|---|---|---|
| 6,515,678 B1 | 2/2003 | Boger |
| 8,155,479 B2 * | 4/2012 | Hoffman et al. ............. 382/276 |
| 2005/0162512 A1 * | 7/2005 | Seakins ........................ 348/62 |
| 2006/0204098 A1 | 9/2006 | Van der Gaast |
| 2009/0059038 A1 | 3/2009 | Seakins et al. |
| 2010/0278453 A1 | 11/2010 | King |
| 2011/0123115 A1 | 5/2011 | Lee et al. |
| 2012/0042288 A1 * | 2/2012 | Liao et al. ................... 715/863 |

OTHER PUBLICATIONS

PCT Written Opinion of the International Search Authority fore PCT/US2012/067431, Applicant: Enhanced Vision Systems, Inc., Form PCT/ISA/210 and 220, dated Mar. 8, 2013 (4 pages).

The extended European search report in European Appl. No. 12852849.4-1901, Applicant: Enhanced Vision Systems Inc. (7pages).

\* cited by examiner

VIEWING AID WITH TRACKING SYSTEM, AND METHOD OF USE

FIELD OF THE INVENTION

The present invention relates to viewing aids used to view images of viewing material, particularly for users with impaired vision.

BACKGROUND OF THE INVENTION

Various viewing aids exist to provide improved viewing of material on a viewing surface within a target field of view. Many such aids allow those with impaired vision to view printed materials (e.g., books and magazines), digital displays (e.g., LCD, LED, or other monitors), and photographs by creating magnified images of the material or images of the material with the color contrast and/or brightness changed. This may be useful for people with difficulty in reading, due to blurred vision, macular degeneration, or other vision impairments.

Existing viewing aids typically include a camera, and a viewing surface within a field of view of the camera. If the material remains at a fixed location on the viewing surface, then either the camera is moved relative to the viewing surface (and material), or the viewing surface (and material) is moved relative to the camera. If the material rests freely on the viewing surface, then the material itself may also be moved relative to the camera (and viewing surface). In either case, successive images of the material captured by the camera are either projected on a separate screen such as with CCTV systems, or on a display integrated with the camera.

For those viewing aids involving movement of the camera, the precision required to position the camera to capture images of the target portion(s) of the material may be difficult to achieve in many situations. This may be especially so if the material is printed material intended for reading, and even more so for those who have macular degeneration and need the image to be enlarged, and/or those with motor skill impairments and/or difficulty with hand-eye coordination. The same is true for those viewing aids involving movement of the viewing surface and/or material, as is done with X-Y tables.

Thus, it is desirable to have a viewing aid that allows enhanced viewing of material on a viewing surface, without requiring significant movement of the camera, viewing surface, or the material itself.

SUMMARY OF THE INVENTION

In accordance with one aspect of the invention, a viewing aid includes a camera, a viewing surface within a field of view of the camera and substantially fixed relative to the camera, a memory in data communication with the camera, and a display in data communication with the memory. The camera is configured to capture an initial image of the viewing material on the viewing surface, and to store the initial image in the memory.

In another aspect of the invention, software determines a location of a tracking element (e.g., a finger, stylus, laser pointer, or other pointer) within the field of view, by identifying X-Y coordinates of the location based on an X-Y reference frame associated with the field of view. The software then maps the location to a corresponding portion of the initial image in memory, and displays on the display an enhanced image corresponding to the mapped portion of the initial image. In another aspect of the invention, the software continuously tracks the tracking element to determine successive locations of the tracking element within the field of view, then maps the successive locations to successive corresponding portions of the initial image in memory, and displays on the display successive enhanced images corresponding to the successive mapped portions of the initial image, thus providing a natural reading experience but with an enhanced image.

In another aspect of the invention, the software alternatively or in addition identifies character elements (or other pattern elements) of the material adjacent the tracking element, maps the character elements (or other pattern elements) to corresponding character elements (or other pattern elements) of the initial image in memory, and displays on the display an enhanced image corresponding to the mapped portion of the initial image. In another aspect of the invention, the software continuously tracks the tracking element to determine successive character elements (or other pattern elements) of the material adjacent successive locations of the tracking element, then maps the successive character elements (or other pattern elements) to corresponding character elements (or other pattern elements) of the initial image in memory, and displays on the display successive enhanced images corresponding to the successive mapped portions of the initial image, again providing a natural reading experience but with an enhanced image.

In this manner, enhanced images of the viewing material may be viewed on a display based on movement of a tracking element such as a finger or a pointer, without requiring significant movement of the camera, viewing surface, or the material itself. The viewing material is typically printed material, such as books, magazines, newspapers, or photographs, but may also be stationary display media such as poster-board presentations, a chalkboard, a CD, DVD, stamps, currency, electronic display media such as a television, computer screen, or cellular phone screen, or even non-flat items such as a prescription medication bottle, or nutrition label. In fact, one application of the present invention is for use to inspect mechanical (e.g., gears), biological (e.g. tissue samples), electrical (e.g., CPU motherboard), or other components or material.

BRIEF DESCRIPTION OF THE DRAWINGS

The foregoing and other aspects of embodiments are described in further detail with reference to the accompanying drawings, wherein.

DETAILED DESCRIPTION OF THE EMBODIMENTS

The description that follows relates to a viewing aid and its method of use. While the invention is well-suited for use by visually impaired people, the invention may also be used in other environments, such as classrooms, auditoriums, and other large-scale viewing surfaces.

Figure 1:
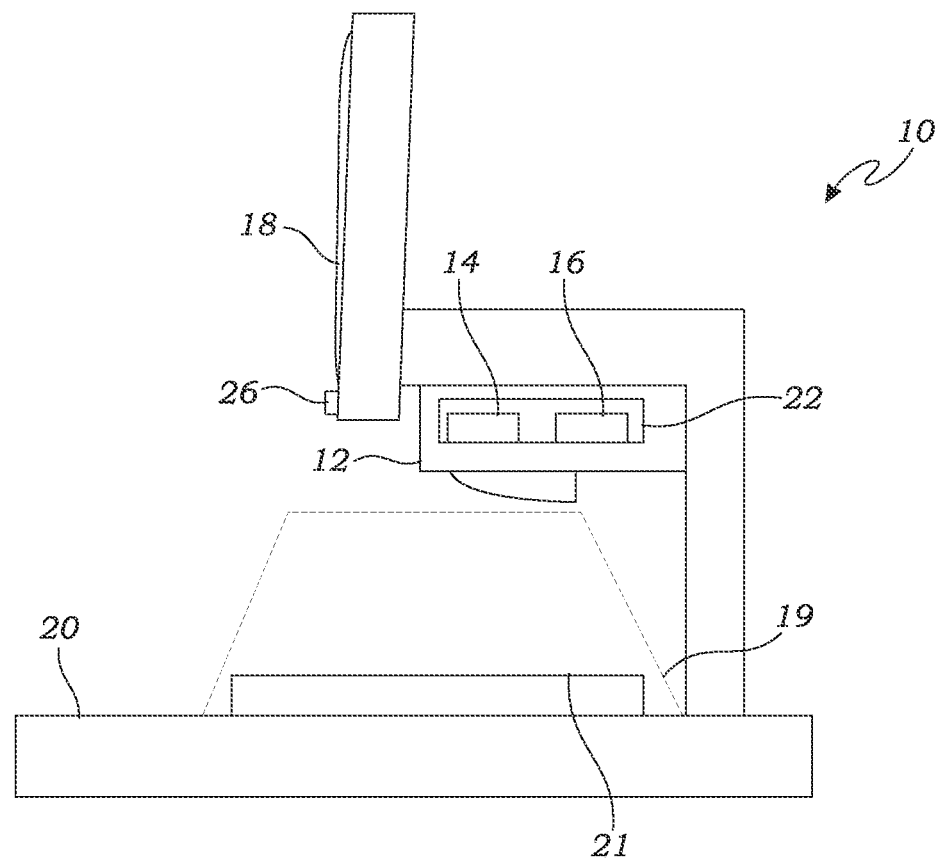
FIG. 1 shows a side view of one embodiment of a viewing aid in accordance with the present invention.

Turning first to FIG. 1, an exemplary viewing aid 10 generally includes a camera 12, a viewing surface 20 within a field of view 19 of the camera 12 and substantially fixed relative to the camera 12, a memory 14 in data communication with the camera 12, and a display 18 in data communication with the memory 14. The camera 12 is configured to capture an initial image of viewing material 21 on the viewing surface 20 and to store the initial image in the memory 14. Software 16 is installed in the memory 14 or another storage area, is controlled by a microprocessor 22, and is programmed to cooperate with the camera 12, memory 14, and display 18 to show enhanced images of the material 21 on the display 18, as will be more fully described herein.

The camera 12 may be any type of camera capable of cooperating with the other elements of the viewing aid 10. The camera 12 is configured to capture an initial image of the material 21 on the viewing surface 20, and to store the initial image in the memory 14. This may be accomplished by a manual trigger such as a button or switch, or by a timer, screen icon, keyboard entry, voice command, or other means. The initial image may be stored in the memory 14 using any conventional means. The initial image should be stored as a high-resolution image of the viewing material 21, to the extent permitted by the camera 12 and associated software.

Figure 2:
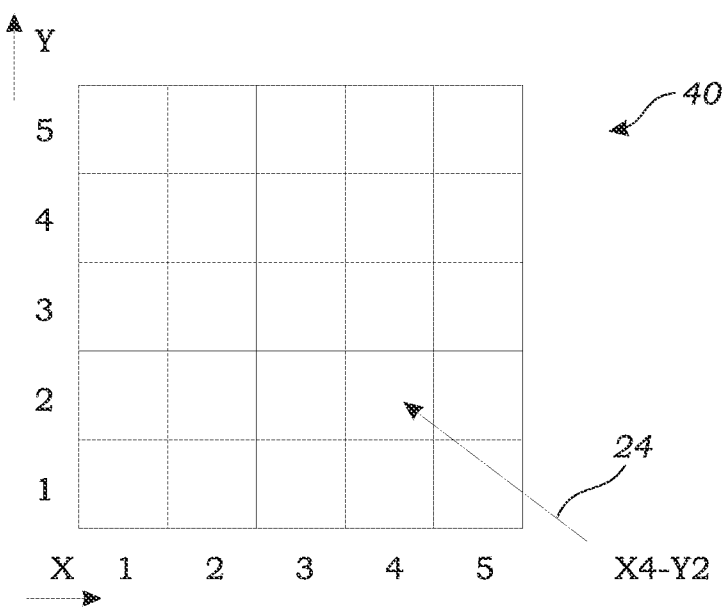
FIG. 2 shows an X-Y reference frame representing the field of view of the camera of FIG. 1.

In one embodiment, the software 16 stores the initial image in the memory 14 in a manner representing that portion of the viewing material 21 on the viewing surface 20 within the field of view 19 of the camera 12. In this embodiment, an X-Y reference frame 40 is used, and for every X-Y coordinate of the viewing surface 20 within the field of view 19 of the camera 12, there is a corresponding portion of the memory 14 representing that portion of the viewing material 21 at said X-Y coordinate. For example, FIG. 2 shows the X-Y reference frame 40 as a 5×5 grid, with a tracking element 24 positioned in cell X4-Y2. This is a simple example. The grid may be as complex as 1,000×1,000 or more. Once the initial image is stored in the memory 14, and the software 16 determines the location of a tracking element 24 within the field of view 19 by identifying X-Y coordinates of the location based on the X-Y reference frame 40 associated with the field of view 19, the location can be mapped to the corresponding portion of the initial image in the memory 14, and then an enhanced image corresponding to the mapped portion of the initial image can be displayed on display 18.

Enhancement typically will be enlargement, but other characteristics of the image may alternatively and/or additionally constitute enhancement, including light amplification or reduction, sharpening, thickening, color modification, font changes, audio corresponding to text or otherwise, and/or other individual character, word, or section emphasis, including language translation if coupled with suitable software. One form of enhancement may include OCR mapping, in which the text of an initial image is converted into ASCII text or other text from a known character set (OCR-converted text), so as the displayed image is magnified, there is no loss of resolution due to the simple scaling of the characters. This enhancement may be used for text only and/or for text combined with pictures. In the latter case, the image layout displayed should substantially match the layout of the initial image, i.e., the scaling of the text should coincide with scaling of the surrounding pictures and other non-text portions of the image. Another enhancement is simply presenting the initial image on the display with no change at all.

In one embodiment, the software 16 identifies character elements of the viewing material 21 within the field of view 19 adjacent the tracking element 24, then maps the character elements to corresponding character elements of the initial image in the memory 14 by using pattern recognition or other suitable software such as well-known OCR software. In this manner, once the initial image is stored in the memory 14, and the software 16 identifies character elements of the viewing material adjacent the tracking element, those characters may be mapped to corresponding character elements of the initial image in memory 14, and an enhanced image corresponding to the mapped portion of the initial image can be displayed on the display 18.

The camera 12 may be any suitable camera, and may include adjustability controls 26 to adjust characteristics of images, such as one or more of a zoom function, viewing in horizontal and vertical directions, lighting controls, and other features well-known in the art. A high-resolution camera having a wide pixel range from 1 megapixel ("MP") to 50 MP is recommended to allow for a wider and more precise range of magnification options. For example, to allow display of an enhanced image up to about 50×, the camera 12 should be a high-resolution camera so the initial image can be magnified digitally without significant blurring.

In some embodiments, more than one camera 12 may be used for redundancy and/or for specific tasks. For example, one camera 12 might be used for capturing the initial image of the viewing material 21, while a second camera might be used for tracking the tracking element 24 as further described herein. With multiple cameras 12, the cameras would not have to be identical in functionality or performance.

The camera 12 is typically fixed with respect to the viewing surface 20. That is, the camera 12 does not move relative to the viewing surface 20, nor does the viewing surface 20 move relative to the camera 12. This is typically a structural feature implemented by the manufacturer. However, this feature may also be implemented by the user for each specific application or series of applications. In the latter case, for example, the camera 12 and/or viewing surface 20 may be configured to be adjusted and then temporarily secured for a specific application.

The viewing material 21 is likewise not moved relative to the viewing surface 20. Instead, the viewing material 21 is fixed to the viewing surface 20, and a tracking element 24 is moved across the material 21 to indicate the desired portion(s) of the viewing material 21 for which enhanced images are to be displayed on the display 18, as further described herein. The concept of having a fixed camera 12, fixed viewing surface 20, and fixed viewing material 21, is to allow a user to concentrate on moving the tracking element 24 in a natural motion such as when moving one's finger across a page being read, as opposed to having to move the camera 12, viewing surface 20, and/or viewing material 21. Minor, insignificant movements (such as by vibrations, friction, misalignment, etc.) of the camera 12, viewing surface 20, and/or viewing material 21, may thus occur, and although such movements should be minimized, the camera 12, viewing surface 20, and viewing material would still be considered fixed.

The camera 12 has a field of view 19, typically fixed due to the fixed nature of the camera 12, but which may be variable or adjustable mechanically or otherwise. A particular field of view 19 should, however, be fixed once the initial image of the viewing material 21 is captured and stored into the memory 14. The field of view 19 may include only a portion of the viewing surface 20, or may include the entire viewing surface 20, and beyond (as seen in FIG. 1).

The viewing surface 20 is typically a substantially flat surface such as is used with X-Y tables, although as described herein the viewing surface 20, unlike an X-Y table, remains substantially fixed relative to the camera 12. The viewing surface 20 may also have gridlines, measurement ticks, or other markings identifying X-Y coordinates of the viewing field 19, and/or fasteners such as clips, clamps, guides, raised or recessed borders, pins, ridges, detents, tabs, or other means for temporarily securing the viewing material 21 thereto. The viewing material 21 may extend beyond the field of view 19 of the camera 12, but only the portions of the viewing material 21 within the field of view 19 of the camera 12 will be captured by the camera 12 to create the initial image to be stored in the memory 14.

The memory 14 is any suitable memory such as RAM or a hard drive, and may be integrated with the viewing aid (as seen in FIG. 1), or otherwise in data communication with the camera 12 as is known in the art, including by wired connection or wireless connection, via closed circuit, local network, or the Internet. The memory 14 and/or microprocessor 22 may be separate from the camera 12, such as in a laptop or personal computer, that communicates by a cable or wireless device with the camera 12, or the memory 14 and/or microprocessor 22 may be included in an external device coupled to the camera 12 or to another part of the viewing aid 10 that communicates with the camera 12. The memory 14 communicates with the camera 12, and is used to store initial images of the viewing material 21, as may also be used to store application and/or operating software to carry out the methods of the present invention as described herein. The memory 14 may have a wide range of storage capacity, e.g., from 1 gigabyte ("gb") to 50 gb to 100 gb or more. The memory 14 may store all of the images recorded in the recording and tracking phases for future reference, or may just store the images in real-time as they are viewed by the camera 12.

The display 18 may be any display suitable of displaying an enhanced image of the viewing material 21, in data communication with the memory 14. Such displays may be liquid crystal displays (LCDs), LEDs, or other technology, flat panel or other, color or monochrome, etc., and may be a stand-alone monitor display, a monitor display integrated and in hard-wired electrical communication with the viewing aid 10 (as seen in FIG. 1), or a separate display otherwise in data communication with the memory 14, including a hand-held display. A display 18 should be selected with resolution quality capable of exploiting the quality of the camera 12, and vice versa.

The display 18 is configured to receive and display images in the field of view 19 that are captured and/or recorded by the camera 12. The images communicated to the display 18 may originate from the software 16 and/or from the camera 12. In one embodiment, the display 18 is capable of magnifying the initial image in the range of about 1×-50× magnification, and preferably 3×-40× magnification. The magnification can be up to 100× or more. In another embodiment, the display 18 is a projector that projects the enhanced image onto another medium, such as a wall, a chalkboard, whiteboard, roll-up screen, or other similar viewing surface.

Different embodiments of the display 18 may also have varying viewing features for modifying the enhanced image. Some displays 18 may be configured to be capable of changing the preview of the initial image as it will be recorded, for example, by changing the brightness and/or the color contrast. In such a case, if the camera 12 has the same capabilities for adjusting the preview of the enhanced image, then the user has the option of initially making adjustments through the camera 12, and then later making further adjustments to the initial image shown on the display 18 before it is stored into the memory 14.

In FIG. 1, the display 18 is only one screen. In an alternative embodiment, there may be two or more screens (not shown), in which a first screen shows the image corresponding to the position tracking element 24, and a second screen shows the enhanced image with the tracking element 24 as it is recorded by the camera 12. In this embodiment, the display 18 may receive the image of the tracking element 24 directly from the camera 12 as the camera 12 records the image, from the memory 14, or from the software 16.

In one embodiment, the camera 12 provides a preview of the initial image before storing same to the memory 14. The camera 12 could include a small camera display (not shown), similar to the displays viewed on personal digital cameras, wherein the camera display shows a preview of the image to be stored. In this manner, the user can use features of the camera 12, e.g., a zoom function, to make adjustments to the previewed image. As an example, the camera 12 may be capable of recording an image having 12×12 inch dimensions, but the user may wish to capture an image having only 8×8 inch dimensions. Based on the preview function, the image may be adjusted to 8×8 inch dimensions prior to be stored in the memory 14. For this purpose, it is preferred the camera 12 has image adjustment functions such as scaling capabilities to capture and record a wide range of dimensions of the initial image, for example, an item as small as a pocket reader or as large as a poster-board.

Alternatively or in addition, the camera 12 may communicate the image preview (including any adjustments) to the display 18, and the display 18 would then show the image preview. The display 18 may have adjustability controls 26 for optimizing the initial image, and such adjustments may then be communicated from the display 18 to the camera 12, such that the camera 12 records the initial image and any adjustments made in previewing the image. It is also possible for both the camera 12 and the display 18 to have adjustability controls 26, or adjustability controls may be in a separate unit that communicates with the camera 12 and/or the display 18.

In yet another embodiment, the components of the viewing aid 10 are integrated in a head-mounted device (not shown) wherein the display 18 is positioned in the user's field of vision, and the other components of the viewing aid 10 are positioned on the device on the user's head. In this embodiment, the display 18 may include a mask or goggle-type configuration for direct viewing by the user.

Figures 4, 5:
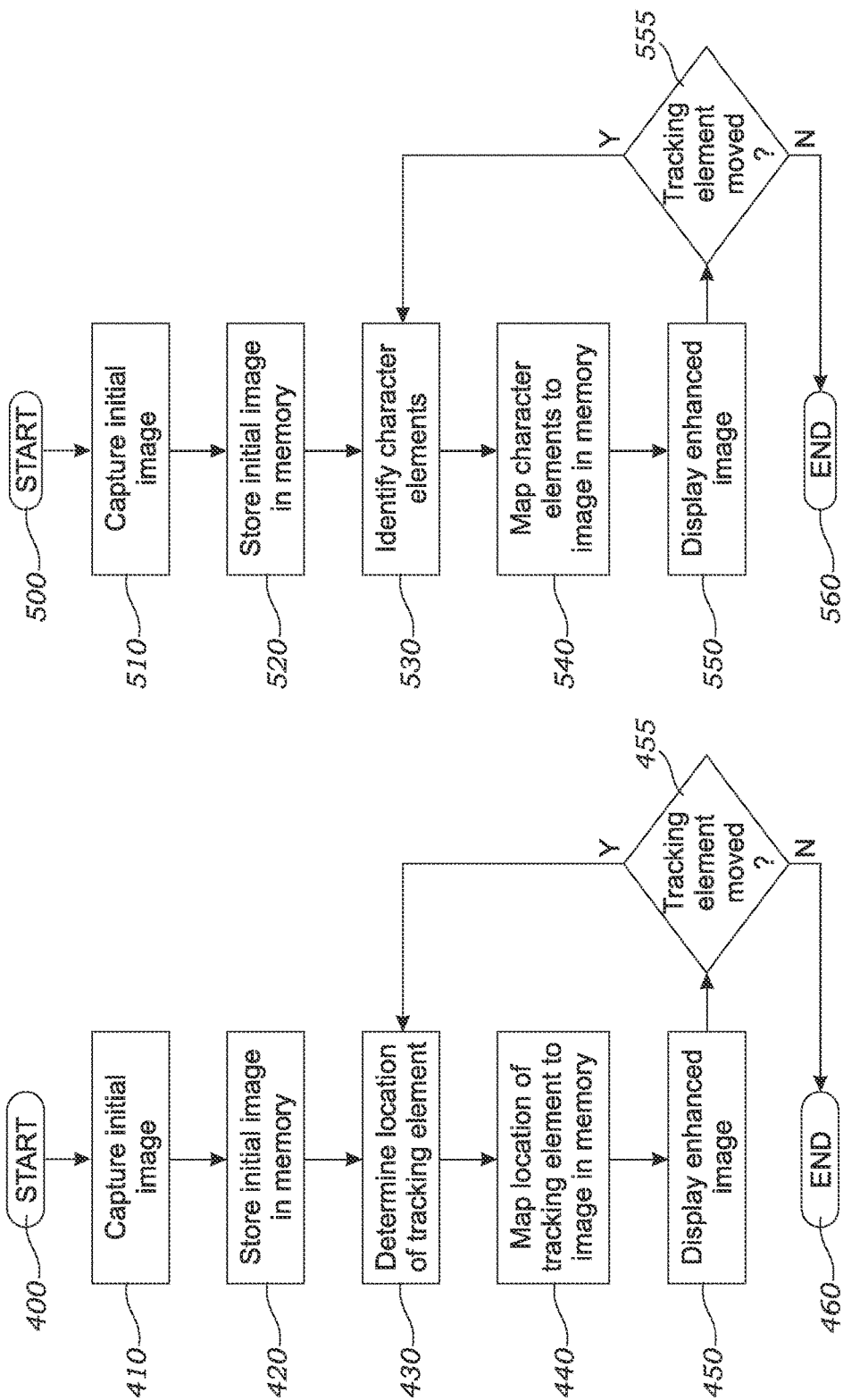
FIG. 4 is a flowchart illustrating a method of the present invention.
FIG. 5 is a flowchart illustrating a method of the present invention.

Turning now to FIG. 4, a method of use of the present invention will be described with reference to a flowchart. The viewing aid as described herein is used to carry out this method. The method begins at Step 400. For practical purposes, the method is broken down into the recording phase (Steps 410-420), and the tracking phase (Steps 430-450).

Before or during the recording phase, however, an X-Y reference frame is established for the viewing surface. The X-Y frame may be pre-calibrated for the particular viewing aid, e.g., if the camera and viewing surface are permanently fixed. In other embodiments, the X-Y reference frame may be set for each use. An example of setting the X-Y reference frame may include adjusting the camera and/or viewing surface (if adjustable) for a desired use, locking them in place, then actuating a control mechanism for the camera to calculate its field of view and establish an X-Y reference frame within the field of view. Another example may be to lock the camera and viewing surface in place (if not already fixed), then place a pointer or actuate a button at one of several known fixed locations on the viewing surface, such that the viewing aid could then calibrate itself through a succession of such actuations. This method may be controlled by interactive software, or may be automated. The specific manner of calibrating and/or establishing the X-Y reference frame is not critical. Rather, what is important to this embodiment is that the relevant components of the viewing aid are able to accomplish the desired result by determining the location of the tracking element within the field of view based on a known X-Y reference frame mapped onto the viewing surface for the particular application.

At Step 410, the camera captures an initial image of the viewing material on the viewing surface, as described herein. This is typically done by the user activating the camera. The image may be previewed and edited as described herein. Once the initial image is in a desired form (which may including scaling), the camera communicates with the memory to store the image in the memory at Step 420, in a manner such that each X-Y coordinate of the viewing surface may be mapped to a corresponding portion of the image. This ends the recording phase.

The tracking phase then begins at Step 430, at which the software determines a location of the tracking element within the field of view by identifying X-Y coordinates of the location based on the X-Y reference frame associated with the field of view. For example, the camera may transmit to the software an image or series of images of the tracking element within the field of view, and the software may focus on the tip of the tracking element and calculate where that tip is within the known X-Y reference frame. Referring to FIG. 2, for example, the software could determine that the position of the tracking element 24 within the X-Y reference frame is X4-Y2. At step 440, the software then maps the X-Y location to the corresponding X-Y portion of the initial image in memory. At Step 450, that portion of the image from the memory, corresponding to the mapped portion of the initial image, is then displayed on the display as an enhanced image, e.g., enlarged. The user thus is able to view an enhanced image of the viewing material on the display, simply by moving the tracking element across the viewing material within the field of view.

The method could then end at Step 460. However, as previously described, in another aspect of the invention the software continuously tracks the tracking element to determine successive locations of the tracking element within the field of view, then maps the successive locations to successive corresponding portions of the initial image in memory, and displays on the display successive enhanced images corresponding to the successive mapped portions of the initial image, thus providing a natural reading experience but with an enhanced image. This is illustrated in FIG. 4 by the loop beginning at Step 455 and returning through Steps 430, 440, and 450, until the tracking element remains stationary or is withdrawn from the field of view.

Thus, after Step 450 when the first enhanced image is displayed, the software determines at Step 455 if the tracking element has been moved within the field of view. If the tracking element has not been moved within the field of view, then it has either remained at substantially the same location as was determined at Step 430, or it has been removed from the field of view altogether. In either of those cases, the method ends at Step 460 as indicated by the N branch off of Step 455. Of course those two situations may also be treated differently. For example, the software could be programmed such that if the tracking element remained at substantially the same location as was determined at Step 430, the display of the enhanced image from Step 450 could be maintained, whereas if the tracking element has been removed from the field of view altogether, the enhanced image could be removed from the display.

Referring back to Step 455, if the tracking element has been moved within the field of view, the method cycles back to Step 430 as indicated by the Y branch off of Step 455. The software may make this determination as to whether the tracking element has been moved, by comparing the previously-determined location of the tracking element to the newly-determined location. The loop from Steps 430-455 may be performed numerous times during a single application. The faster this occurs, the smoother the display of the enhanced images will appear. In other words, the frames per second of displaying the enhanced images will likewise increase, thus producing a smoother view of successive images.

Turning now to FIG. 5, an alternative method of the present invention will be described with reference to another flowchart. The basic flow is similar to that shown in FIG. 4, but in this alternative method, instead of determining the location of the tracking element and mapping that location to the image in memory, character or pattern recognition is used to map to the image in memory.

Again, the viewing aid as described herein is used to carry out this method. The method begins at Step 500, and is broken down into the recording phase (Steps 510-520), and the tracking phase (Steps 530-550). At Step 510, the camera captures an initial image of the viewing material on the viewing surface, as described with reference to FIG. 4. The image may be previewed and edited as described herein. Once the initial image is in a desired form (which may including scaling), the camera communicates with the memory to store the image in the memory at Step 520, in a manner such that various patterns (e.g., text) may be identified. Any suitable Optical Character Recognition (OCR) or pattern recognition software may be used. This ends the recording phase.

The tracking phase then begins at Step 530, at which the software identifies character elements of the viewing material within the field of view adjacent the tracking element. Again, any suitable OCR or other pattern recognition software may be used. At Step 540 the software maps the character elements to corresponding character elements of the initial image in the memory, and then at Step 550 displays on the display an enhanced image corresponding to the mapped portion of the initial image. The user thus is able to view an enhanced image of the viewing material on the display, simply by moving the tracking element across the viewing material within the field of view.

Figure 3A:
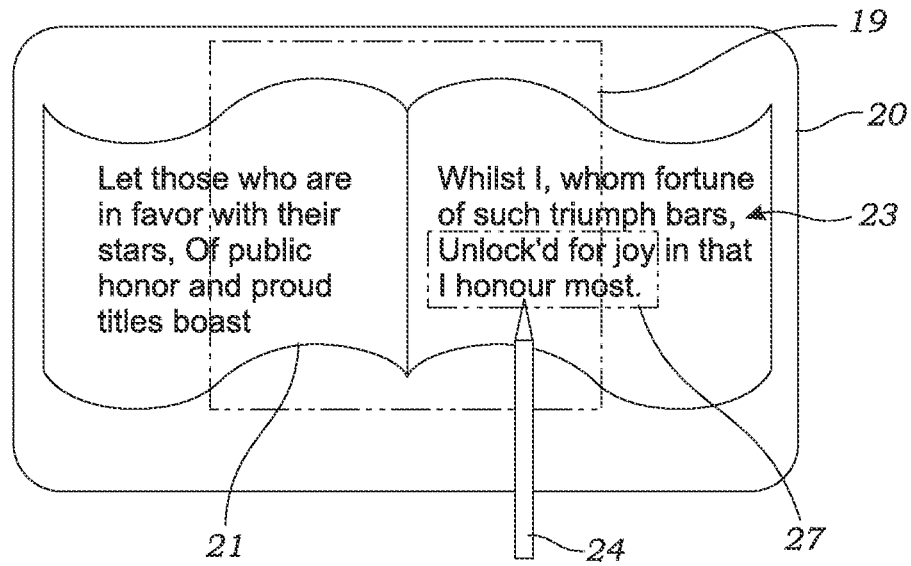
FIG. 3A shows a top view of viewing surface with viewing material thereon, partially within a field of view of a camera, along with a tracking element.
Figure 3B:
FIG. 3B shows a display displaying an enhanced image corresponding to the section of the viewing material pointed to by the tracking element in FIG. 3A.

As an illustrative example, refer to FIGS. 3A-3B. FIG. 3A shows viewing material 21 on a viewing surface 20 within a field of view 19 of a camera (not shown). The viewing material comprises text 23. A tracking element 24 is shown pointing to a tracked area 27 of the text 23 that includes the characters "Unlock'd for joy" on one line and "I honour most." on the next line. In this instance, the software (such as OCR software) identifies those characters or a portion thereof in the vicinity of the tracking element 24, and is able to map that text (and/or associated surrounding patterns, including blank space) to the initial image stored in the memory. The software then communicates that portion of the initial image to the display, where the image is shown as an enhanced image, such as an enlarged image, as seen in FIG. 3B. This example illustrates a simple text recognition, and FIG. 3B shows only the text immediately adjacent the tracking element 24 for simplicity. But sophisticated OCR/pattern recognition software may be used as well, and the tracked area 27 may be larger or smaller than shown in the example illustrated by FIG. 3A and FIG. 3B. The tracked area 27 may also have different dimensions and/or shapes, fixed or customizable, and the enhanced image may be displayed in a virtual window taking on such various dimensions and/or shapes. In this manner, an entertainment element is added to the viewing experience, because, for example, the virtual viewing window on the display 24 may be ovoid, circular, star-shaped, etc., and/or may be framed within artwork such as a cartoon character's head, company logo, etc.

As with the method described with respect to FIG. 4, this method could end at Step 560. But the software may continuously track the tracking element to determine successive character elements of the viewing material within the field of view adjacent successive locations of the tracking element, perform OCR/pattern recognition at each successive location, map the successive character elements to corresponding character elements of the initial image in memory, and display on the display successive enhanced images corresponding to the successive mapped portions of the initial image. This is illustrated in FIG. 5 by the loop beginning at Step 555 and returning through Steps 530, 540, and 550, until the tracking element remains stationary or is withdrawn from the field of view.

Thus, after Step 550 when the first enhanced image is displayed, the software determines at Step 555 if the tracking element has been moved within the field of view. If the tracking element has not been moved within the field of view, then it has either remained at substantially the same location as was determined at Step 530, or it has been removed from the field of view altogether. In either of those cases, the method ends at Step 560 as indicated by the N branch off of Step 555. Those two situations may also be treated differently as described with respect to FIG. 4. And similar to the method described with reference to FIG. 4, referring back to Step 555, if the tracking element has been moved within the field of view, the method cycles back to Step 530 as indicated by the Y branch off of Step 555. The loop from Steps 530-555 may be performed numerous times during a single application.

Although particular embodiments of the present invention have been shown and described, it will be understood that it is not intended to limit the present inventions to the preferred embodiments, and it will be apparent to those skilled in the art that various changes and modifications may be made without departing from the spirit and scope of the present invention. Thus, the present invention is intended to cover alternatives, modifications, and equivalents, which may be included within the spirit and scope of the present invention as defined by the claims.

What is claimed is:

1. A viewing aid comprising:
   a camera;
   a viewing surface within a field of view of the camera, and substantially fixed relative to the camera;
   a memory in data communication with the camera; and
   a display in data communication with the memory;
   wherein the camera is configured to capture an initial image of viewing material on the viewing surface and to store the initial image in the memory;
   the viewing aid further comprising software programmed to 1) determine a first location of a tracking element within the field of view by identifying X-Y coordinates of the location based on an X-Y reference frame associated with the field of view, 2) map the location to a corresponding first mapped portion of the initial image in the memory which is less than the full initial image, 3) display on the display a first magnified image generated from the initial image stored in the memory, the first magnified image corresponding only to the first mapped portion of the initial image, 4) continuously track a motion of the tracking element to successive locations within the field of view different than the first location using the camera, 5) map the successive locations to corresponding successive mapped portions of the initial image in the memory which is less than the full initial image, and 6) display on the display successive magnified images generated from the initial image stored in the memory, the successive magnified images corresponding only to respective successive mapped portions of the initial image thereby panning the initial image to correspond to the motion of the tracking element.

2. The viewing aid of claim 1, wherein the camera has a fixed field of view.

3. The viewing aid of claim 1, wherein the successive magnified images comprise OCR-converted text from the successive mapped portions of the initial image.

4. The viewing aid of claim 2, wherein the successive magnified images comprise OCR-converted text from the initial image.

5. The viewing aid of claim 1, further comprising adjustability controls configured to adjust characteristics of the first magnified image.

6. The viewing aid of claim 1, wherein the first magnified image comprises a magnification of the first mapped portion in a range of 3× to 50× magnification of the initial image stored in the memory and the successive magnified images comprise a magnification of the respective successive mapped portions in a range from 3× to 50× magnification of the initial image stored in the memory.

7. A viewing aid comprising:
   a camera;
   a viewing surface within a field of view of the camera, and substantially fixed relative to the camera;
   a memory in data communication with the camera; and
   a display in data communication with the memory;
   wherein the camera is configured to capture an initial image of viewing material on the viewing surface and to store the initial image in the memory;
   the viewing aid further comprising software programmed to identify character elements of the viewing material within the field of view adjacent a tracking element in a first location, map the character elements to corresponding character elements of the initial image in the memory to determine a first mapped portion of the initial image corresponding to a portion of the viewing material adjacent the tracking element in which the first mapped portion is less than the full initial image, display on the display a first magnified image generated from the initial image and corresponding only to the first mapped portion of the initial image, identify successive character elements of the viewing material within the field of view adjacent the tracking element in a successive location different than the first location, map the successive character elements to corresponding character elements of the initial image in the memory to determine a successive mapped portion of the initial image corresponding to a portion of the viewing material adjacent the successive location in which the successive mapped portion is less than the full initial image, and display on the display a successive magnified image generated from the initial image and corresponding only to the successive mapped portion of the initial image.

8. The viewing aid of claim 7, wherein the software is further programmed to continuously track the tracking element to determine additional successive character elements of the viewing material within the field of view adjacent additional successive locations of the tracking element, map the additional successive character elements to corresponding character elements of the initial image in the memory, and display on the display additional successive magnified images corresponding to the additional successive mapped portions of the initial image.

9. The viewing aid of claim 7, wherein the successive magnified images comprise OCR-converted text from the successive mapped portions of the initial image.

10. The viewing aid of claim 7, wherein the first magnified image comprises OCR-converted text from the initial image.

11. The viewing aid of claim 7, further comprising adjustability controls configured to adjust characteristics of the magnified image.

12. The viewing aid of claim 7, wherein the first magnified image comprises a magnification of the first mapped portion in a range from 3× to 50× magnification of the initial image stored in the memory and the successive magnified image comprises a magnification of the successive mapped portion in a range from 3× to 50× magnification of the initial image stored in the memory.

13. A method of viewing an image, using a viewing aid comprising a camera, a viewing surface within a field of view of the camera and substantially fixed relative to the camera, a memory in data communication with the camera, and a display in data communication with the memory, the method comprising:
  capturing, with the camera, an initial image of viewing material on the viewing surface;
  storing the initial image of the material in the memory;
  determining, using software and the camera, a first location of a tracking element within the field of view by identifying X-Y coordinates of the location based on an X-Y reference frame associated with the field of view;
  mapping the location, using the software, to a corresponding first mapped portion of the initial image in the memory which is less than the full initial image;
  displaying on the display a first magnified image generated from the initial image stored in the memory, the first magnified image corresponding only to the first mapped portion of the initial image;
  continuously tracking a motion of the tracking element to successive locations within the field of view different than the first location using the camera;
  mapping the successive locations to corresponding successive mapped portions of the initial image in the memory which is less than the full initial image; and
  displaying on the display successive magnified images generated from the initial image stored in the memory, the successive magnified images corresponding only to respective successive mapped portions of the initial image thereby panning the initial image to correspond to the motion of the tracking element.

14. The method of claim 13, wherein the camera has a fixed field of view.

15. The method of claim 13, wherein displaying the successive magnified images on the display comprises displaying OCR-converted text from the successive mapped portions of the initial image.

16. The method of claim 14, wherein displaying the successive magnified images on the display comprises displaying OCR-converted text from the initial image.

17. The method of claim 13, further comprising using adjustability controls to adjust characteristics of the magnified image.

18. The method of claim 13, wherein the first magnified image comprises a magnification of the first mapped portion in a range from 3× to 50× magnification of the initial image stored in the memory and the successive magnified images comprise a magnification of the respective successive mapped portions in a range from 3× to 50× magnification of the initial image stored in the memory.

19. A method of viewing an image, using a viewing aid comprising a camera, a viewing surface within a field of view of the camera and substantially fixed relative to the camera, a memory in data communication with the camera, and a display in data communication with the memory, the method comprising:
  capturing, with the camera, an initial image of viewing material on the viewing surface;
  storing the initial image of the material in the memory;
  identifying, using software, character elements of the viewing material within the field of view adjacent a tracking element in a first location;
  mapping the character elements, using the software, to corresponding character elements of the initial image in the memory to determine a first mapped portion of the initial image corresponding to a portion of the viewing material adjacent the tracking element in which the first mapped portion is less than the full initial image;
  displaying on the display a first magnified image generated from the initial image and corresponding to only the mapped portion of the initial image;
  identifying successive character elements of the viewing material within the field of view adjacent the tracking element in a successive location different than the first location;
  mapping the successive character elements to corresponding character elements of the initial image in the memory to determine a successive mapped portion of the initial image corresponding to a portion of the viewing material adjacent the successive location in which the successive mapped portion is less than the full initial image; and
  displaying on the display a successive magnified image generated from the initial image and corresponding only to the successive mapped portion of the initial image.

20. The method of claim 19, further comprising:
  continuously tracking the tracking element with the software to determine additional successive character elements of the viewing material within the field of view adjacent additional successive locations of the tracking element;
  mapping the additional successive character elements, with the software, to corresponding character elements of the initial image in the memory; and displaying on the display additional successive magnified images corresponding to the additional successive mapped portions of the initial image.

21. The method of claim 20, wherein displaying the successive magnified images on the display comprises displaying OCR-converted text from the successive mapped portions of the initial image.

22. The method of claim 19, wherein displaying the magnified image on the display comprises displaying OCR-converted text from the initial image.

23. The method of claim 19, further comprising using adjustability controls to adjust characteristics of the magnified image.

24. The method of claim 19, wherein the first magnified image comprises a magnification of the first mapped portion in a range from 3× to 50× magnification of the initial image stored in the memory and the successive magnified image comprises a magnification of the successive mapped portion in a range from 3× to 50× magnification of the initial image stored in the memory.

* * * * *